(12) United States Patent
Hignett

(10) Patent No.: US 7,614,667 B2
(45) Date of Patent: Nov. 10, 2009

(54) PIPE CONNECTION

(75) Inventor: Ian Harold Hignett, Norfolk (GB)

(73) Assignee: HGDS Inc., Las Vegas, NV (US)

( * ) Notice: Subject to any disclaimer, the term of this patent is extended or adjusted under 35 U.S.C. 154(b) by 0 days.

(21) Appl. No.: 11/293,563

(22) Filed: Dec. 2, 2005

(65) Prior Publication Data

US 2006/0157982 A1 Jul. 20, 2006

(30) Foreign Application Priority Data

Dec. 6, 2004 (GB) ................... 0426628.4
Dec. 24, 2004 (GB) ................... 0428350.3

(51) Int. Cl.
*F16L 25/00* (2006.01)
(52) U.S. Cl. ..................................... 285/334
(58) Field of Classification Search ................. 285/333, 285/334
See application file for complete search history.

(56) References Cited

U.S. PATENT DOCUMENTS

| | | | | |
|---|---|---|---|---|
| 4,192,533 A | * | 3/1980 | Blose | 285/334 |
| 4,244,607 A | * | 1/1981 | Blose | 285/92 |
| 4,494,777 A | * | 1/1985 | Duret | 285/55 |
| 4,521,042 A | * | 6/1985 | Blackburn et al. | 285/334 |
| 4,525,001 A | * | 6/1985 | Lumsden et al. | 285/328 |
| 4,629,221 A | * | 12/1986 | Lumsden et al. | 285/328 |
| 4,707,001 A | * | 11/1987 | Johnson | 285/332.3 |
| 5,092,635 A | * | 3/1992 | DeLange et al. | 285/334 |
| 5,498,035 A | * | 3/1996 | Blose et al. | 285/94 |
| 6,347,814 B1 | * | 2/2002 | Cerruti | 285/334 |
| 6,442,826 B1 | | 9/2002 | Staudt et al. | |
| 6,511,102 B2 | * | 1/2003 | Quadflieg et al. | 285/333 |
| 2004/0036286 A1 | | 2/2004 | Della Pina et al. | |

FOREIGN PATENT DOCUMENTS

| | | |
|---|---|---|
| EP | 0127560 | 4/1984 |
| EP | 1030029 | 2/2000 |
| FR | 2281488 | 8/1975 |
| GB | 800348 | 6/1955 |

* cited by examiner

*Primary Examiner*—David E Bochna
(74) *Attorney, Agent, or Firm*—Galgano & Associates PLLC

(57) ABSTRACT

An external pipe joint between a pin section (30) and a box section (40) is disclosed. The end of the pin and box sections have complementary screw-threaded portions, adapted to interengage along the greater part of the axial length thereof, the threads being inclined in the same direction and at an acute angle to the longitudinal axis of the joint. The box section extends at least to a stop shoulder (44) having a frusto-conical head portion which is positioned adjacent a complementary stop shoulder recess (36) on the pin section. In order to sealingly receive the frusto-conical head portion, the complementary stop shoulder recess (36) comprises a cone receiver having a conical cross-section. An annular groove (45) intermediate the threaded portion and the stop shoulder of the box section is included.

7 Claims, 8 Drawing Sheets

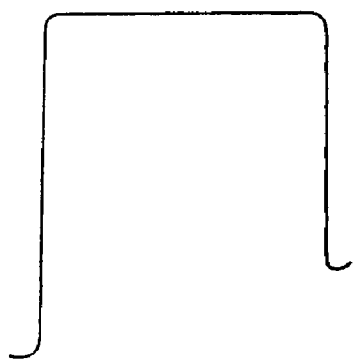 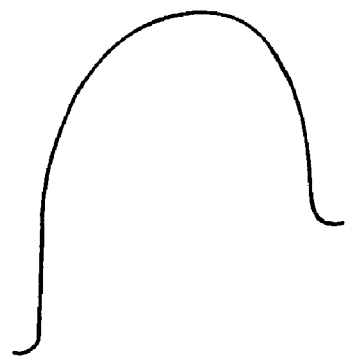
*Fig. 8A*  *Fig. 8B*

PIPE CONNECTION

FIELD OF THE INVENTION

The present invention relates to an improved screw-threaded pipe joint, the pipes being intended for the transport of fluids such as oil and gas. The joint is particularly suited for use in pipes subject to both bending and compressive forces.

BACKGROUND TO THE INVENTION

Threaded connections for pipes are well known in the gas and oil industry. The pipes to which the connections are applicable include those which are used in both the exploration for and the transport of fluid materials. Because of the nature of the materials and the pressures at which the pipes operate it is important that the seal in the joints between adjacent pipe sections remains effective. Such joints can be difficult to maintain due to the forces to which the length of the pipe is normally subjected. The forces can, on a particular joint, be compressive or tensive along the axis of the pipe or both tensive and compressive for example, when the pipe is in a curved configuration. The forces, together with pressure differentials across the width of the pipe, can weaken a seal and create a pathway for the fluid within the pipe to leak out.

In the oil and gas industries, it is obviously desirable to extract from all parts of the reserve being exploited. In recent years with the advent of improved joints there has been a move away from the previous practice of introducing new substantially vertically orientated bore holes. It is now well known to run a pipeline horizontally through the reserve. In doing this, a portion of a previously drilled bore hole can be used. Such a method however requires the introduction of substantial curvature into the pipeline in order to go from being vertically directed to horizontally directed. The individual joints between pipes must therefore be able to withstand the resultant compressive force.

In order to improve metal-to-metal seals in the connections, a number of common features are typically included as part of the joint. Firstly, the threaded portion of the joint is angled with respect to the main axis of the pipe sections. Secondly, a frusto-conical, non-threaded shoulder is normally included at the end of the male section of pipe (the male section often being referred to as the pin) with a corresponding recess in the female section (often referred to as the box). The shoulder can also include curved portions, chamfers and other features to improve the strength of the resulting seal.

Often in order to further strengthen the joint a corresponding seal is provided on the outer surface of the pipe joint between the box section and the pin section. Such outer joints usually suffer the disadvantage that the crest height of the screw-thread diminishes towards the outer edges of the pipe to accommodate the shoulder. This lesser crest height reduces the effectiveness of the outer seal.

It is therefore an object of the present invention to provide a seal which seeks to address the above problems and provide a pipe joint having an improved inner and outer seal.

SUMMARY OF THE INVENTION

According to the invention there is provided an external pipe joint between a pin section and a box section, the end of the pin and box sections having complementary screw-threaded portions, adapted to interengage along the greater part of the axial length thereof, the threads being inclined in the same direction and at an acute angle to the longitudinal axis of the joint, the box section extending at least to a stop shoulder having a frusto-conical head portion which is positioned adjacent a complementary stop shoulder recess on the pin section; the complementary stop shoulder recess comprising a cone receiver having a frusto-conical cross-section and adapted to sealingly receive the frusto-conical head portion;

wherein the box section includes an annular groove intermediate the threaded portion and the stop shoulder.

The groove permits the root of the threads to be cut more deeply into the wall of the box section so enabling the crest heights to remain constant along the length of the thread. Moreover, the box section is strengthened as stress forces within the box section are better distributed.

Advantageously, the crest heights of the threaded portion remain constant along the length of the thread. The thread therefore is stronger to resist tensive forces on the two sections which provide the pipe joint. Optionally, the taper subtends an angle of 2-3° with the axis of the pipe joint.

Preferably, the surface of the stop shoulder is substantially parallel to the axis of the pipe joint includes one or more inwardly convexed curved portions. Said curved portions distribute stress within the joint enable a better seal to be formed. Particularly preferably, said surface of the stop shoulder additionally comprises a substantially flat portion.

The groove advantageously has a rectangular cross-section. Particularly advantageously, one or both of the sides of the rectangle are linked to the base of the rectangle by a curved surface. The inclusion of the curves or other connecting surfaces redistributes stress within the box section.

BRIEF DESCRIPTION OF THE DRAWINGS

The invention will now be described with respect to the drawings which show one embodiment of a screw threaded joint. In the drawings;

FIGS. 8A-8B illustrate cross-sectional profiles of the annular grooves.

DETAILED DESCRIPTION OF THE INVENTION

Figure 1:
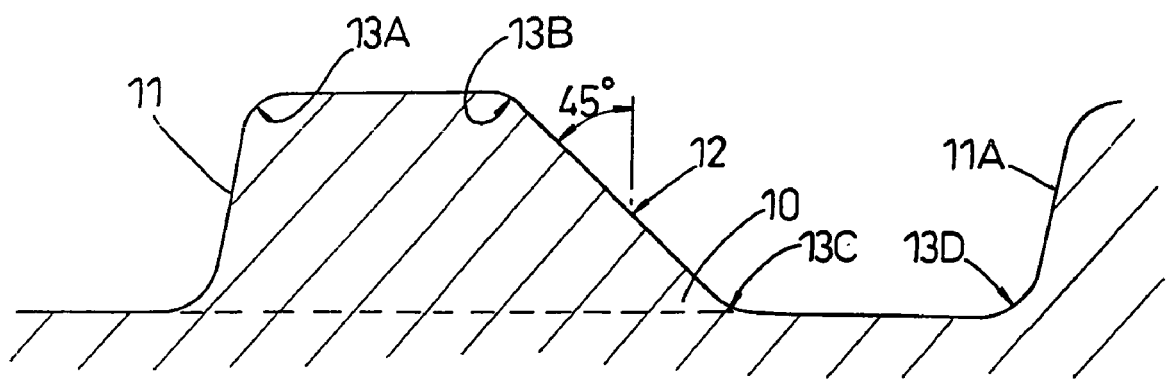
FIG. 1 is an illustration of the crest of a Box thread.
Figure 2:
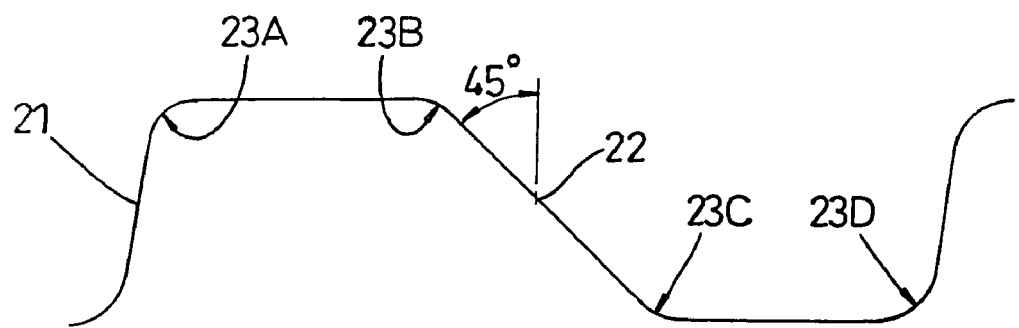
FIG. 2 is an illustration of the crest of a Pin thread.

FIGS. 1 and 2 show a crest of part of the box thread and of the pin thread respectively, which threads are known in the art and are suitable for use in conjunction with the present invention. In order to provide a stronger joint, the thread is normally set at an angle to the longitudinal axis of the pipe joint. In FIGS. 1 and 2 the angle, as subtended by the roots of the thread with said axis, shown by the dotted line 10, is $\tan^{-1}$ (1/24) or approximately 2.4 degrees. It will be recognized that this angle can be varied and its value will depend upon the pipe section and the use to which the pipe is to be put.

In use, faces 11 and 21 face in the direction along the major length of the pipe section and engage or at least abut each other. These faces 11 and 21 subtend an angle of 10 degrees to a surface perpendicular to the axis of the pipe section. The faces 12 and 22 also engage or abut each other in use. The slope of the faces 12, 22 is approximately 45 degrees to the surface perpendicular to the axis of the pipe. Although the dimensions of the crest depend upon the dimensions of the pipe section itself, for a typical pipe of radius 4.22 cm (1.660"), the thread will typically have the following dimensions. The distance from the mid-point of the face 11 to the face 12 is 0.16 cm (1/16) of an inch and from the mid point of face 11 to the corresponding face 11A of the adjacent crest, 0.32 cm (1/8 of an inch). Threads can be seen to have a number of curved portions 13A, B, C, D and 23A, B, C, D which have radii of 0.02 cm (0.008"). In order to provide sufficient strength to the thread to resist deformation under stresses induced, the crest height is approximately 0.08 cm (0.033") as measured from the thread root.

Figure 3:
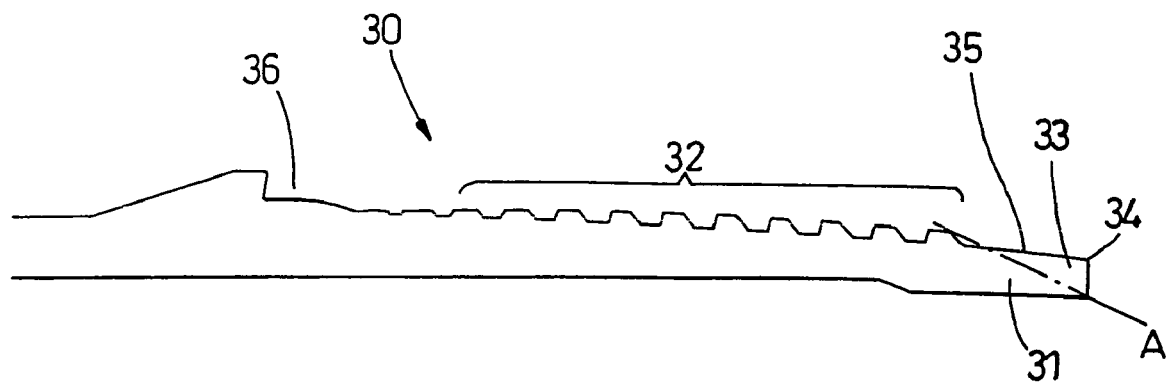
FIG. 3 is a further illustration of a Pin Design.

In common with prior art joints, the pin 30 can be seen, in FIG. 3, to have a stop shoulder 31 at its distal end beyond the end of the threaded section 32. The stop shoulder 31 has a head portion 33 of generally frusto-conical section with line A as the base, and having a rounded apex 34. The stop shoulder 31 engages a correspondingly shaped recess 41 (FIG. 4) of the box 40. In order to improve the seal between the stop shoulder 31 and the recess 41, the surface 35 of the stop shoulder 31 or the corresponding surface 43 of the recess can include curved portions the curvature projecting from the one pipe section towards the other pipe section to improve the seal. The curvature enables a seal to be maintained, even when the pipe joint is subject to bending forces such as in the situation where the longitudinal axes of the individual pipes making up the joint are not aligned with one another. The curvature introduced need not be continuous along the entire length of the surface 34 or 35 but can simply run along a portion of the surface. It is believed that where an already formed joint is subject to bending forces the curvature enables the seal to slide along the curved portion so that the seal remains fluid tight. Moreover, the inner wall of the pin is thickened along a portion 35 to increase the strength of the pin and minimize its tendency to bend on application of torque.

The distal stop shoulder 44 of the box section which in use forms an outer seal with a corresponding recess 36 of the pin 30 can include features as described above for the stop shoulder 31.

It has been found that, for both the inner seal and the outer seal, curved portions are advantageously included on the box section.

Figure 4:
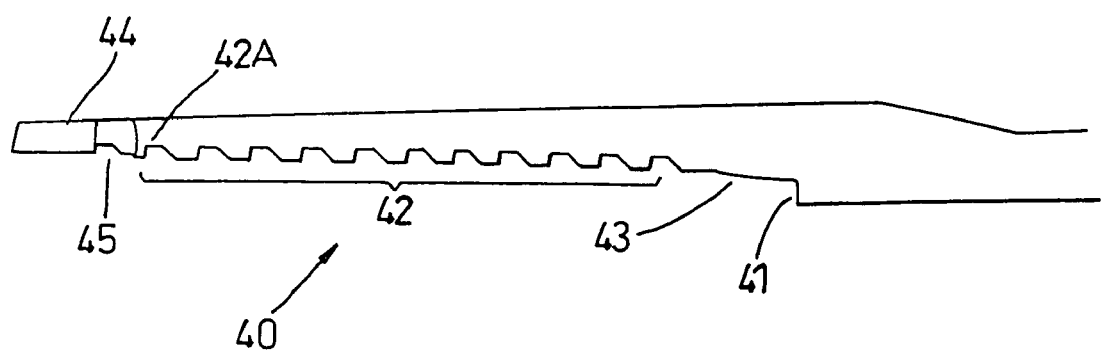
FIG. 4 is a further illustration of a Box Design, including a groove.

In addition to these features, as shown in FIG. 4, the box section includes an annular groove 45 intermediate the distal end 44 and the final crest 42A of thread 42. The groove 45 fulfills a number of functions. Firstly, the groove 45 enables the crest heights of the thread 42 to remain constant along the length of the thread and to retain a reasonable angle with respect to the pipe's axis. Typically, the height of the crest is reduced towards the distal end of a box section. Secondly, due to the inclusion of the groove, one end of the threaded portion is effectively displaced radially compared to prior art threads. Given a fixed longitudinal distance between the two ends of a thread, the length of the threaded portion of the present invention will be greater than for prior art threads. The longitudinal density of threads is therefore greater for the threads of the present invention than for those of the prior art and the strength of the threaded joint is thereby increased.

It has moreover been found that, using conventional tooling apparatus, the inclusion of a groove enables the distal end of the box section to be machined more easily than has hitherto been the case.

Figure 5:
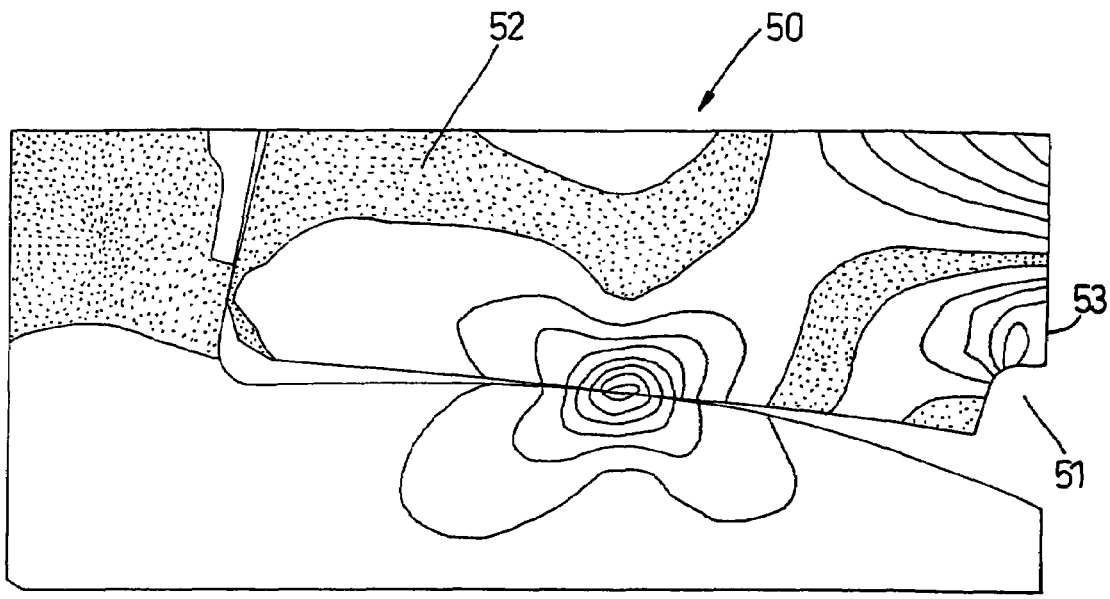
FIG. 5 illustrates the stress included within a joint.

A further improvement in performance is achieved by the groove 45 in that the stresses within the box section are concentrated in a small area. This is illustrated in FIG. 5 in which darker areas indicate areas under higher stress. In FIG. 5, the box section 50 includes a groove 51 behind the stop shoulder 52. The area around the groove 51 can be seen to be under higher stress than the stop shoulder 52. Moreover, the higher stress area 53 is surrounded by material of lower stress, which assists in the harmless dissipation of the resultant strain in the material, so that the high strain does not cause significant damage.

Figure 6:
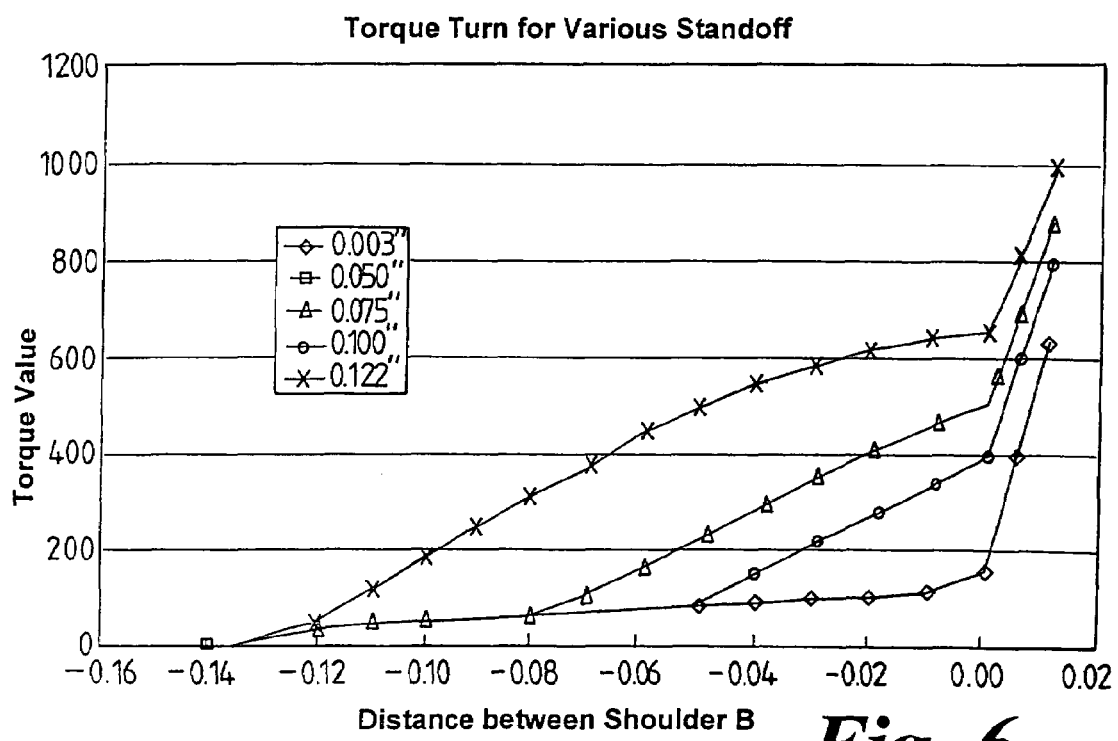
FIG. 6 show the effect of inclusion of grooves of different depth, on the behavior of the joint when torque is applied to form the pipe joint.
Figure 7A:
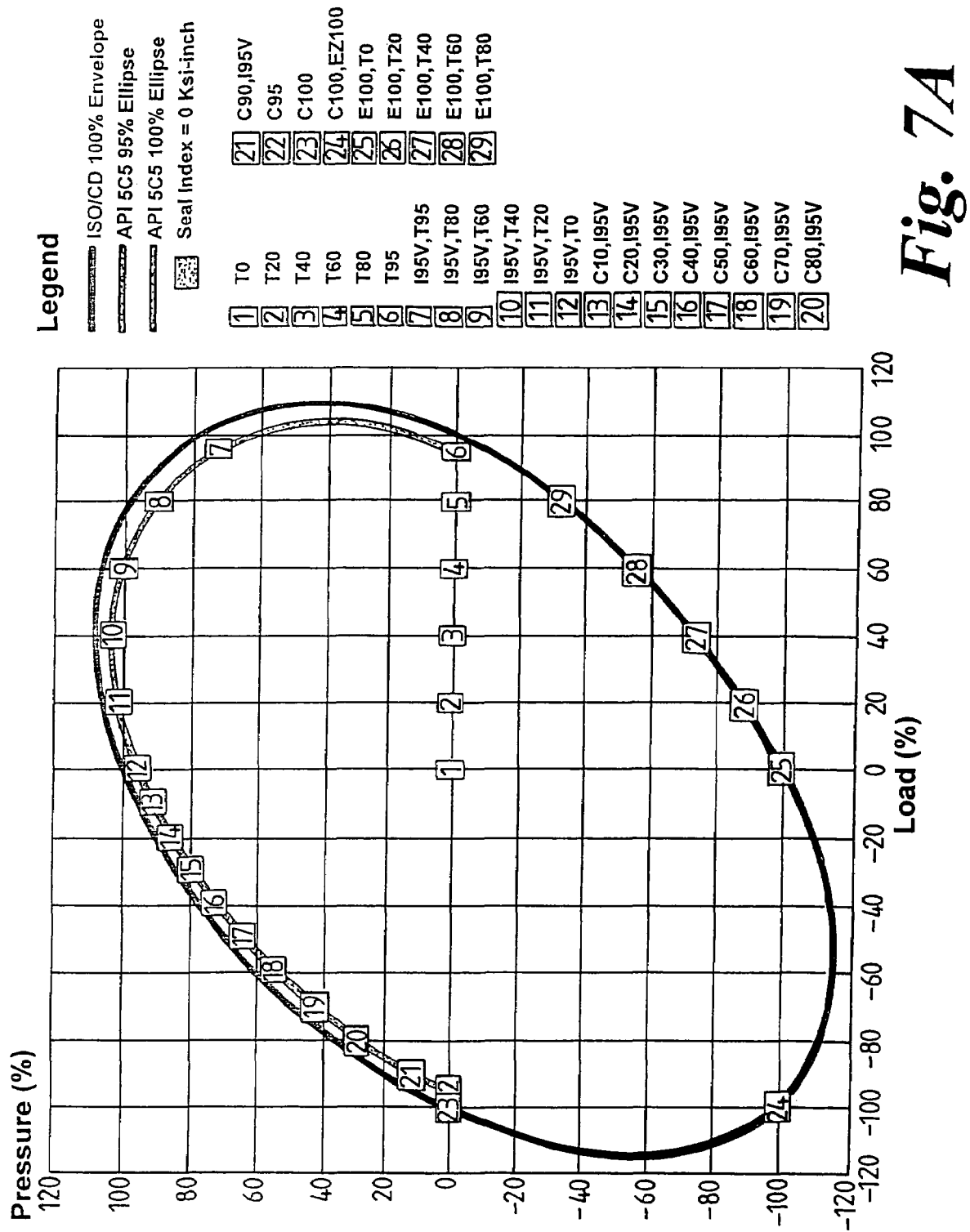
FIGS. 7A-7G illustrate the effect of including a groove when the joint is subjected to compression and tension.
Figure 7B:
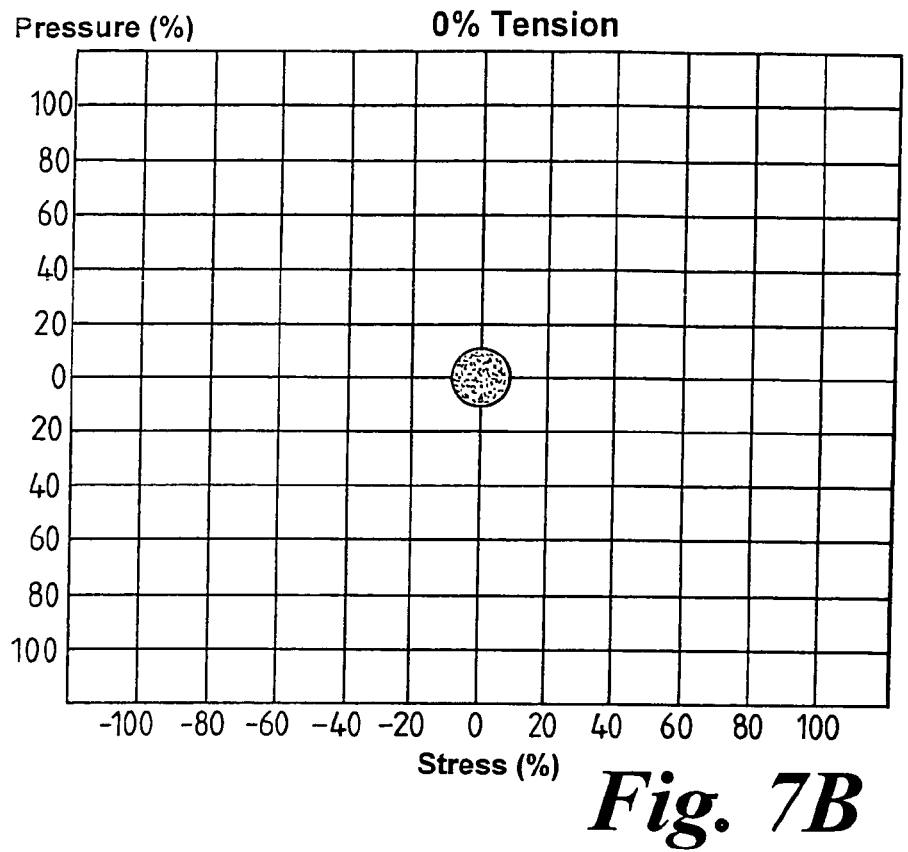
Figure 7C:
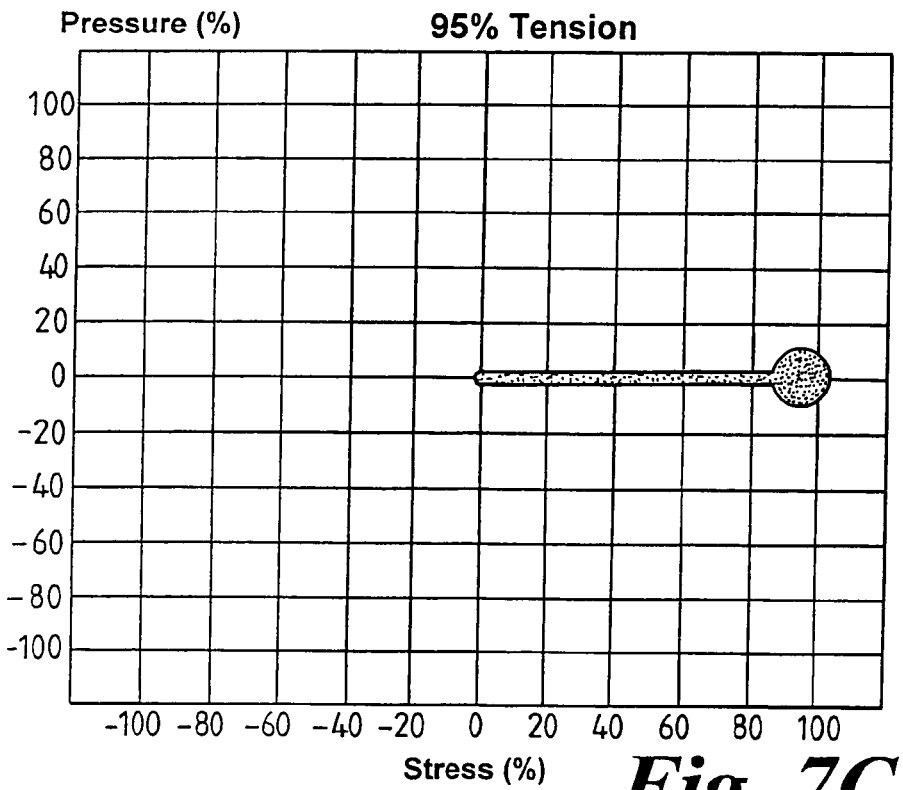
Figure 7D:
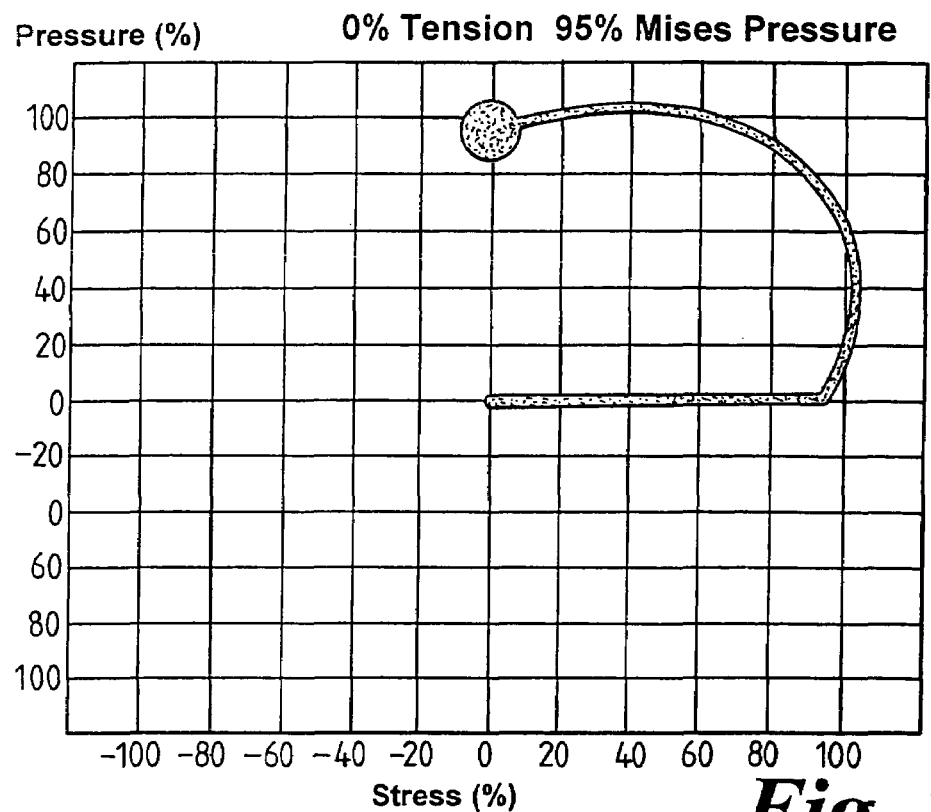
Figure 7E:
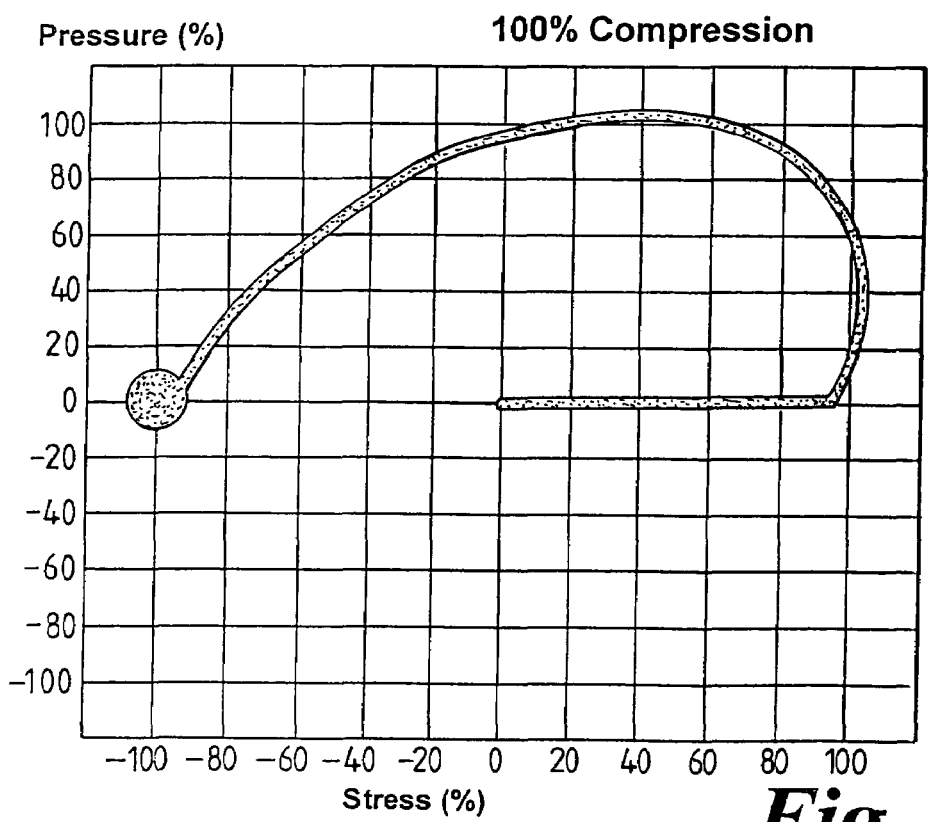
Figure 7F:
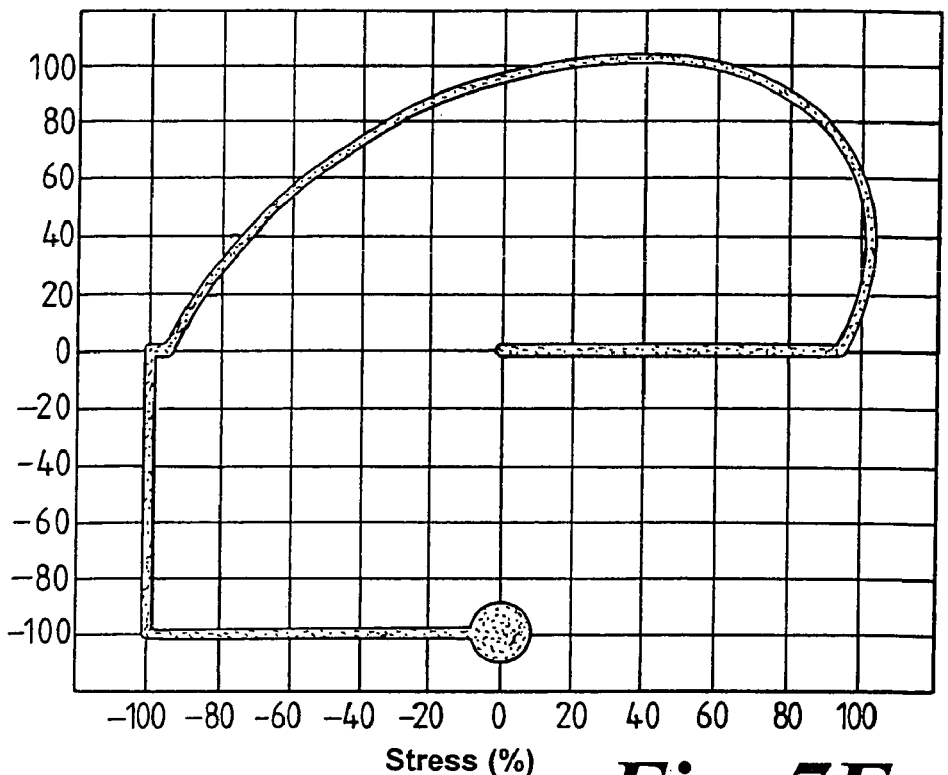
Figure 7G:
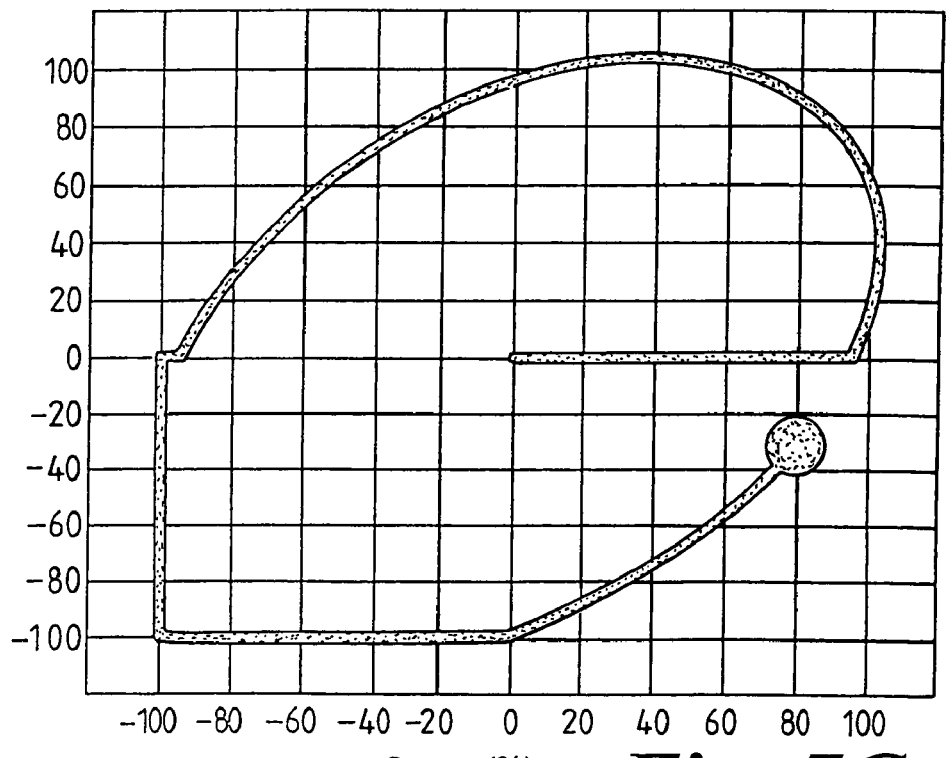

FIG. 6 illustrates the torque required to make up the pipe joint. The x axis on the graph shows the distance between the shoulders 44 and recess 36 of the box and pin respectively. The y axis shows the torque required to turn the joint components. The graph shows the lines corresponding to five values of stand, that is the distance between the shoulder and the thread. As can be seen, once the stop shoulder 44 of the box section engages the pin, the torque required dramatically increases.

The performance of joints including a rectangular groove as described above is illustrated in the attached graphs FIG. 7A-G. In these Figures, the T and C relate to tensive and compressive force applied to the pipe, and I95V refers to an applied internal pressure.

The cross-section of the groove 45 can be made substantially rectangular as shown in FIG. 8A. Alternatively, the groove can include a sloping or a curved surface joining the base of the groove to one or both of the side walls. This configuration is illustrated in FIG. 8B.

It will of course be understood that the invention is not limited to the specific details described herein, which are given by way of example only, and that various modifications and alternations are possible within the scope of the invention.

The invention claimed is:

1. An external pipe joint between a pin section and a box section each having an end, the end of the pin and box sections having complementary screw-threaded portions having threads with crests adapted to interengage along the greater part of the axial length thereof, the threads being inclined in the same direction and at an acute angle to the longitudinal axis of the joint, the threads of said box section having a final crest terminating adjacent to a stop shoulder having a frusto-conical head portion which is positioned adjacent a complementary stop shoulder recess on the pin section;

the complementary stop shoulder recess comprising a cone receiver having a frusto-conical cross-section and adapted to sealingly receive the frusto-conical head portion; and wherein the box section includes an annular groove comprising two side walls and a recessed bottom wall therebetween, wherein said final crest of said screw-threaded portion of said box section defines one of said side walls of said groove and the stop shoulder of said box section defines the opposite side wall of said groove, said annular groove having a width no greater than the axial distance between the adjacent crests of said threads.

2. A pipe joint according to claim 1, wherein the crest heights of the threaded portion remain constant along the length of the thread.

3. A pipe joint according to claim 1, wherein the taper of the thread subtends an angle of 2-3° with the axis of the pipe joint.

4. A pipe joint according to claim 1, wherein the surface of the stop shoulder substantially parallel to the axis of the pipe joint includes one or more inwardly convex curved portions.

5. A pipe joint according to claim 4, wherein said surface of the stop shoulder additionally comprises a substantially flat portion.

6. A joint according to claim 1, wherein the groove has a rectangular cross-section open at one end.

7. A joint according to claim 6, wherein one or both of the sides of the rectangle are linked to the base of the rectangle by a curved surface.

* * * * *